March 19, 1968  F. R. KULL ET AL  3,374,014
SWAGED SEALS
Filed July 27, 1965  2 Sheets-Sheet 1

INVENTOR.
Francis R. Kull
Ronald Waeltz
BY
Synnestvedt & Lechner
ATTORNEYS

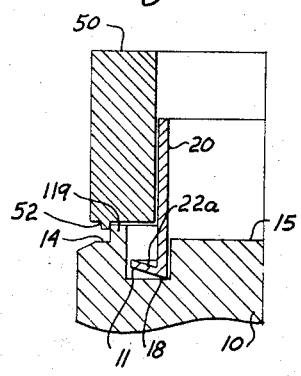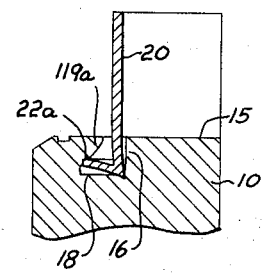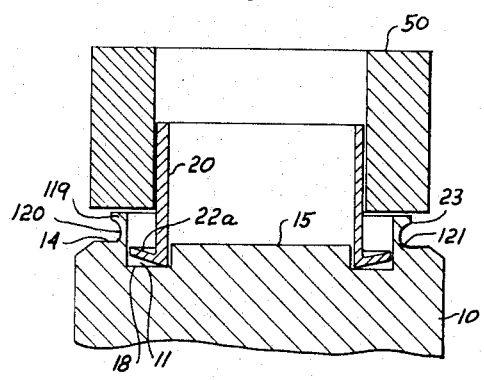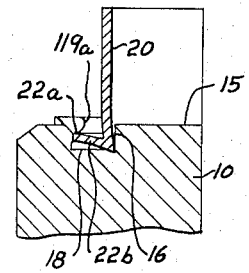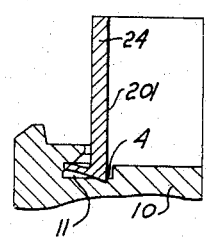

�# United States Patent Office 3,374,014
Patented Mar. 19, 1968

3,374,014
SWAGED SEALS
Francis R. Kull, Warminster, and Ronald Waeltz, Hatboro, Pa., assignors to Standard Pressed Steel Co., Jenkintown, Pa., a corporation of Pennsylvania
Filed July 27, 1965, Ser. No. 475,059
4 Claims. (Cl. 287—20.3)

This invention relates generally to the sealing or interlocking of two parts, and is directed to both the method of forming the seal and to the seal itself. The invention has particular applicability in the forming of strong seals where at least one of the parts is a tube or includes a tubular section at the desired point of sealing. Still more particularly, the invention is concerned with the forming of a strong hermetic seal primarily by mechanically interlocking the parts and without the use of sealing aids such as sealants, adhesives, heat or chemical action.

The seals formed in accordance with this invention can be effectively utilized in a great many different situations. However, they are especially useful in the forming of housings for solid state devices such as rectifiers, transistors and the like, and they can also be used in connection with other mechanical, electrical or electronic devices which are desirably housed in an assembly which can withstand internal and external fluid pressures, and where it is desired to employ a seal which will not be impaired by temperature variation cycles, vibration, shock or by compressional, tensional, torsional or shearing forces.

The assembling of a stud mounted silicon rectifier will be used herein for purposes of illustrating how seals can be made in accordance with this invention and also will serve to illustrate cerain of the objectives and advantages of such seals.

In making semiconductors, it is necessary to form a hermetically sealed assembly. Those assemblies which are stud mounted have presented particularly difficult problems in attaching the copper stud bases to the steel glass sealed caps. Heretofore, this joining has been primarily effected by soldering, brazing, welding or a combination of these methods, however, some attempts have been made to form joints by cold flow or cold weld techniques.

One of the major problems encountered in the making of heat sealed assemblies is the contamination of the semiconductor wafer. In forming heat seals, gaseous impurities are released from the solder or brazing materials in the joint or from lacquers and latex used to coat the wafer, and these impurities carry over and contaminate the wafer so that its properties are impaired. Further, where projection welding techniques are employed there is the ever present danger of contamination of the dice or wafer by "spit out" or splatter. Further, another important difficulty encountered in making the heat sealed housings arises by virtue of the fact that the heat will soften the metal in the thread area and weaken the threads.

Still another source of difficulty encountered in the forming of heat sealed semi-conductor housings involves the matter of distortion of the base due to the heating. If the stud face on which the wafer is secured is distorted by as little as 0.001″, the frequency of electrical failures increases significantly; buckling or distortion of this order can occur in the making of heat seals even when steps are taken to cool the base during the sealing operation.

These difficulties primarily arise because of the heating of the metal parts in order to effect the seal and they significantly decrease the production efficiency and impair the quality of the finished product. In addition, heat sealing techniques involve extensive fixturing and time consuming operations in order to produce a good seal.

As previously mentioned, cold flow joining techniques have been developed; for example, the patent application of Warren F. Dahl, Ser. No. 84,439 filed Jan. 23, 1961, and now Patent No. 3,198,874 is directed to semi-conductor housings and their manufacture by a cold flowing operation. The present invention represents a modification and improvement of the method of the Dahl patent and also of the "heatless seals" produced in accordance with such method. In the Dahl patent, the cap part is provided with a special configuration that enables the forming of a unique hermetically tight seal. The "spring back" feature (to be discussed hereinafter) of the Dahl type seal is also utilized in the seals made in accordance with this invention but it is obtained in a different manner and by the utilization of a much simpler cap configuration that greatly reduces production costs without in any way impairing the integrity of the seal.

The disadvantages of the prior art seals are overcome by the heatless seals formed in accordance with the present invention, some typical embodiments of which are illustrated in the following drawings; the invention, however, is not to be construed as limited to the particular structures shown therein.

In the drawings, FIGURE 1 is a cross section of a cap member and a base member which shows a typical sealing configuration before effecting the interlock;

FIGURES 6 and 7 are cross sectional side elevations of an alternative form of a sealing configuration;

FIGURES 8 and 9 are cross sectional side elevation of another alternative form of a sealing configuration.

FIGURE 10 is a cross sectional side elevation illustrating one way to insure prevention of deflection of the dice mounting plateau.

In the various figures where parts are identified by the same number, functional identity of the parts is indicated. In some instances, however, parts functioning in the same manner may be identified by different numbers.

Referring now to the illustrative embodiment of the invention as shown in FIGURES 1 to 4, the assembly comprises two parts—a base member 10, and a cap member 20. The base member 10 is provided with an annular groove 11 which is adapted to receive an end portion of cap 20. In most assemblies made in accordance with the invention the base and cap preferably have somewhat different plasticity characteristics, e.g., a steel cap and a copper base. However, by proper dimensioning and by suitable control of the mating pressure, it is possible to form satisfactory seals from two parts formed of the same material or from materials having very similar plasticity characteristics.

Figure 1A:
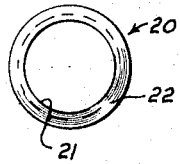
FIGURE 1a is a plan view, from the bottom of the cap of FIGURE 1, showing the positioning of some of the main elements of the cap.
Figure 1:
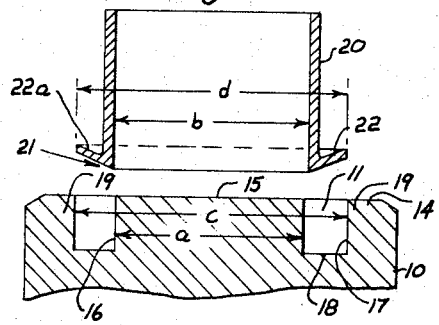
FIGURE 1b is a plan view from the top of the base member of FIGURE 1.

As shown in FIGURES 1 and 1a, the cap 20 is a tubular part having a circular cross section; however, other cross sectional configurations can be employed if it is necessary or desirable to do so. The end of the tube which is to be interlocked with the base part terminates at a sharp annular edge 21 lying in a plane generally perpendicular to the tube axis. The tube end is also provided with an outwardly cantilevered circumferential flange 22. In the illustrated embodiments of the invention, cantilevered flange is shown in only one form. It will be understood that there are other configurations or arrangements of the flange and tube end that will provide a sharp or acutely angled edge on the end of the tube that can be embedded in the base and that will permit a significant downward (as viewed in FIGURES 1–4) bending or deflection of the flange. Thus, for example, the flange may project outwardly from the tube wall from a point inboard of the tube end, and in such cases, the flange need not be angled upwardly relative to the tube axis as viewed in the drawings. Also, the sharp or acutely angled tube end can be provided by beveling either or both of the inner or outer walls of the tube end.

Figure 1B:
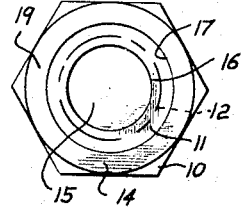
Figure 2:
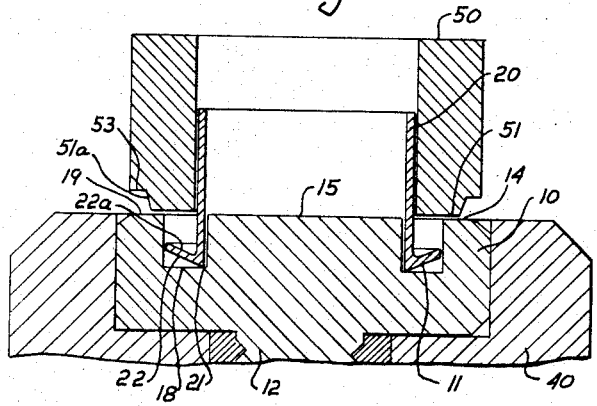
FIGURE 2 is a cross section showing the cap and base of FIGURE 1 positioned in the press prior to the application of pressure to seal the cap in the base.

The base member 10, as shown in FIGURES 2 and 1b is a threaded stud 12 having a hexagonal head. An annular groove 11 is formed in the top face of the stud head. This groove is adapted to concentrically receive the end of the cap having the cantilevered flange. In the assembly shown in FIG. 2 the bottom of the groove 18 functions as a bottoming stop and serves to initially position flange 22 relative to the upper face 14 of the base so that in subsequent swaging operations base material from the zone generally surrounding the upper portions of the outer periphery of groove 11 can be plastically flowed over the upper surface 22a of the flange around its entire periphery and cause the flange 22 to bend downwardly. The positioning or bottoming stop can also be provided by any shoulder of base material projecting into groove 11 that will arrest and relatively position the cap and base preparatory to sealing and that is capable of withstanding loads that will cause bending of the flange in the sealing operation.

The inner diameter of the groove $a$ is less than the inner tube diameter $b$ in the portion thereof which subsequently will be positioned within the groove 11; and the outer base groove diameter $c$ approximates but is slightly larger than the maximum diameter $c$ of the flange to permit the flanged end of the cap part to slip into the groove 11.

Figure 3:
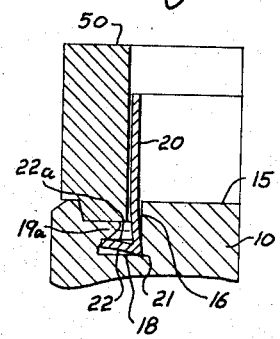
FIGURE 3 is a cross section showing a portion of the cap and base of FIGURE 2 in the press after the parts have been interlocked and before the punch has been removed.

The assembly of components of the FIGURE 1 embodiment can be seen in FIGURES 2 and 3. The base member 10 is placed in a confining die 40, which provides a fixed support to under portions of stud while permitting access to the grooved face 14. However, if the base material is sufficiently hard, the die need not be a confining die. The cap 20 is then positioned squarely on the base 10 with flange 22 inserted and coaxially received by the base groove 11. A swaging tool or punch member 50 which is adapted to slip over and surround the cap, is then positioned as shown with its working pressure applying face 51 resting on the upper surface 14 of the base immediately surrounding the outer periphery 17 of groove 11. The working face 51 of the punch extends inwardly over the groove in the base and is contoured 51a and controllably moved in an axial direction to provide for swaging a predetermined volume of base material over the upper face of the flange. Thus step 53 provides a means which helps to control the depth of penetration of the punch. The inter-relation of the nose diameter of the punch and the depth of the step in relation to the outside diameter of the groove provides control of the amount of material to be forced into the groove. Pressure in a direction generally perpendicular to the plane of the base, i.e., in line with the cap axis, is then applied by suitable pressing means, such as conventional, mechanical or hydraulic presses.

The actual pressure to be applied by the press to effect the seal will depend on various factors especially the configuration of the parts, their dimensions and the physical properties of the base and cap materials. The relative plasticity of the two parts is in most instances the most important property to be considered although the hardness, elasticity, and similar properties related to the deformability and flowability of the material under pressure should be considered. The pressure applied in the sealing of any given configuration should be sufficient to initiate plastic flow of one of the base material at points which are subjected to pressure. In instances where rather delicate or fragile instrumentalities such as solid state devices or the like are affixed to one of the seal forming members at the time the seal is formed, the pressure employed should not be so great that it will set up forces that are capable of distorting or deforming that portion of the assembly to which the instrumentality is affixed.

When axial pressure is applied by the punch 50 to the subtended base material, the base material in the portion where the outer periphery of the groove meets the face of the base (the material in this zone is designated 19 in FIGURE 1), can be caused to flow plastically inwardly into groove 11 and over the upper surface 22a of flange 22 around its entire periphery. The cold flowed material is shown in FIGURE 3 as 19a. The swaging of the material 19 of FIG. 2 to the condition 19a shown in FIG. 3 drives the sharp annular edge 21 of the tubular cap part into the base material at the bottom 18 of the groove and also deflects the flange 22 downwardly when viewed as in FIGURES 1–4. The deflection of the flange should not be so great as to impair its spring action and the deflection should not cause the bottom surface 22b of the flange to be pressed firmly against or embedded in the bottom of the groove in the base. In this way, the end of the tube is immobilized and a hermetically tight seal is formed. In the swaging operation, a sufficient mass of base material must be displaced and pressed against the bent flange to resist the tendency of the deflected flange to return to its normal unstressed condition. Thus, in accordance with the invention and as shown in the FIGURE 1 to 4 embodiment, the deflection of flange 22 (see FIGURES 3 and 4) induces an elastic stress and the immobilization of the tube part and the pressure of the swaged base material on the flange maintains the assembly in a state of elastic stress.

The residual "spring back" or elastic stress which is set up in highly important in the formation of good hermetic seals, especially where the cap and base have different thermal expansion coefficients and where the instrumentality is to be subjected to extreme variations in temperature.

The spring back causes the seal to be maintained by permitting the cap to follow the expansion of the base without breaking the seal. For example, where the base is copper and the cap is steel, the depth of the base groove will, on heating, expand at a more rapid rate than the steel cap will elongate; the residual spring back, however, maintains the flange 22 in intimate contact with the base despite the differences in expansion rates of the two metals. As the copper expands and contracts, the difference is taken up or compensated by the tendency of the deflected spring member to follow the expansion of and contraction of the base metal. In this way, the residual "spring back" maintains the seal between the cap and the base because of the pressure which is at all times exerted by the swaged material 19a of the base against the upper surface 22a of the bent flange.

To test the tightness of seals made in accordance with this invention, the assembled and sealed housings were mounted on a Veeco leak detector (MS-9), the interior of the housing was evacuated by drawing and maintaining a vacuum of 0.01 micron. The housing was then surrounded with an environment of helium, the discharge from the vacuum pump was fed to an analyzed by a mass spectrometer to determine whether or not any helium was leaking into the interior of the housing. Assemblies made in accordance with this invention did not show or develop any leakage when tested in this way.

The embedment of the sharp annular edge 21 of the cap in base material at the bottom of the groove hermetically seals the cap and base. This has been demonstrated by drilling small holes through flange 22, assembling the housings and subjecting them to the leak test mentioned above-such assemblies also did not show or develop leakage.

Figure 4:
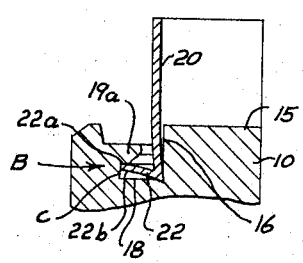
FIGURE 4 is a cross section showing a portion of the cap and base as in FIGURE 3 with the punch removed.

Independent of the sealing action developed by the embedment of the cap end 21 in the base, a hermetic seal is also formed at point B (FIGURE 4) by the swaged material that presses against the upper surface 22a of the flange around its entire periphery. This has been demonstrated by notching the tube end of the cap 21 so that the interior of the housing is interconnected with the base groove on the underside of flange 22, and then subjecting such housings to the aforesaid leak test—such assemblies also did not show or develop leakage.

Where the assembly is intended for use in connection with the housing of a solid state device, it is preferred to employ a sealing configuration which will include a surface within the housing which will not be deflected or buckled when the seal is effected. This is desirable because the assembly of the instrumentality requires the mounting of the dice or wafer on the base stud mount before joining the cap and base. Therefore, any buckling of the base immediately beneath the dice will tend to impair the electronic characteristics of the device or even break the crystal. Bucking or distortion of the plateau 15 as little as 0.001" can seriously impair the properties of the device and interfere greatly with production efficiency.

Where the wall of tubular cap part is relatively thin the swaging operation will also cause some deflection of the leading end of the tube. It will be deflected slightly inwardly and wedged against the wall 16 and be embedded in the shoulder formed by the junction of the inner groove wall 16 and the groove bottom 18. This can be seen in FIGS. 3, 4, 7 and 9. FIGURE 3 shows the assembly with the punch forced to its proper depth. Material 19a is forced into the groove deflecting the cantilever flange downwardly causing a force at point B and a reactive force at point C. After removal of the punch as shown in FIGURE 4, the spring back of the cantilever beam maintains pressure at points B and C thus maintaining a seal at both these points. Inward deflection of the cap due to assembly pressure results in an outward spring action to maintain sealing pressure at point B. This is considered a secondary force.

If the groove is sufficiently deep, the contact between the groove wall 16 and the deflected tube end will not cause the dice mounting plateau 15 to buckle or distort to an objectionable degree. However, if the overall configuration is such that the groove is relatively shallow, e.g., as in FIGURE 10, then bucking and distortion of the plateau 15 can be prevented by using a cap with a sufficiently thick or rigid wall 24 to prevent its inward deflection during the swaging operation.

This arrangeemnt will provide a distinct gap 4 between the inner cap wall 20 and the inner groove wall. The tendency of the sealing pressures to transmit forces tending to distort the mounting plateau 15 will vary somewhat with the size of the gap 4 and also the depth of the base groove 11. The wider the gap, the less will be the tendency for the plateau to buckle. Similarly, the deeper the groove depth or the greater the difference in height between the plateau and the bottoming stop, the less will be the tendency for distortional forces to be transmitted through the base to cause buckling of the plateau.

Figure 5:
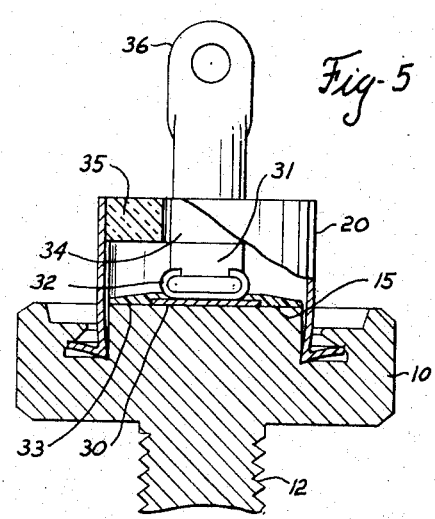
FIGURE 5 is a side elevation of an assembled stud mounted, glass sealed, silicon rectifier—the housing has been partly broken away and the base sectionalized to illustrate the positioning of the parts.

FIGURE 5 illustrates a fully assembled semi-conductor namely a silicon rectifier in which the sealing configuration employed is the same as that illustrated in FIGURES 1 to 4. The unit is assembled in more or less the same sequence of operations employed in the making of brazed or weld stud mounted housings. After machining the stud blank it is plated with a metal such as gold or silver which will mask the base during the subsequent etching operation. The wafer 30 is soldered on the plateau 15, the lead 31 and the lead connector 32 are then secured to the wafer 30 by soldering and the assembly etched to develop the desired electrical characteristics. If desired, lacquer and latex coatings 33 can be applied to the wafer and the lead connector. The cap 20 and base are then sealed in the manner illustrated in FIGURES 2, 3 and 4; however, in the FIGURE 5 embodiment the cap includes a conduit 34 through which contact with lead 31 can be established. Conduit 34 is insulated from the cap by a glass seal 35.

FIGURES 6 and 7 illustrate a modification in which the base material that is flowed or swaged over the flange (see 119a) in FIGURE 7 is derived from a ring of base material 119 of uniform cross section that surrounds the outer periphery of groove 11 and projects (as in FIGURE 6) up from the face 14 of the base. Also illustrated in this embodiment is the use of an alignment tang 52 on the working face of the punch 50—this may be eliminated when the work pieces are precisely dimensioned and where precision tools and presses are employed to swage the seal.

FIGURES 8 and 9 illustrate a further modification and improvement over the embodiment illustrated in FIGURES 7 and 8. In FIGURE 8, the ring 119 is provided with a necked portion 120 positioned to permit the ring to collar collapse and flow more readily. The neck 120 is formed by reducing the outside diameter of the ring thereby forming a thinner walled portion at the point where it is initially desired to have the ring collapse. In this type of sealing arrangement, the initial assembly of the base and cap member before sealing should provide for positioning the cap relative to the base in a spatial relationship such that material displaced from the ring will be able to move inwardly before engaging the upper surface 22a of the flange on the cap part. In other words, the uppermost portion 23 of the flange should be below the narrowest portion of the neck 120 where collapse will first occur. It is also desirable to provide the neck portion with a slight radius 121 at the bottom where it joins the base. This serves to locate where the neck will buckle first when pressure is applied and insures that it will buckle inwardly.

We claim:

1. In combination, a base member and a cap adapted to be interlocked, said cap having a tube part of circular cross section, said base member having an annular groove adapted to concentrically receive the leading end portion of the tube part, said tube end portion terminating at a sharp annular edge and having an outwardly cantilevered circumferential flange whose outer edge lies in a plane intersecting the axis of the tube part at a point inboard of sharp annular edge; swaged material from the outer wall of the groove pressing against the flange surface around its entire upper periphery, the flange being deflected and bent downwardly to a position in which the outer peripheral portions of the bottom surface of the flange are spaced from and not in contact with the base and the leading end of the tube immobilized by the sharp annular edge of the tube part being driven into and below the surface of a shoulder of base material projecting into the groove to interlock and seal the cap and base, said interlock being characterized in that an elastic stress is induced and maintained in the flange by the co-action of the swaged material pressing against the upper surface of the flange and the immobilization of the tube end.

2. In combination, a base member and a tube like cap part adapted to be interlocked and form a seal, said base having an annular groove adapted to concentrically receive the leading end portion of the tube-like cap part, said end portion having a cantilevered circumferential flange that projects outwardly and upwardly from the end of the tube part, swaged base material from the outer wall of the groove pressing against the upper flange surface around its entire periphery, the flange being deflected and bent downwardly to a position in which the outer peripheral portions of the bottom surface of the flange are spaced from and not in contact with the base and the leading end of the tube immobilized by being driven into and below the surface of the base at the bottom of the groove to seal the interlock, said interlock being characterized in that an elastic stress is induced and maintained in the flange by the coaction of the swaged material pressing against the flange and the immobilization of the leading of the tube end.

3. In combination, a base member and a tube like cap part adapted to be interlocked and form a seal, said base having an annular groove adapted to concentrically receive the leading end portion of the tube-like cap part, said end portion having a cantilevered circumferential flange that projects outwardly and upwardly from the end of the tube part, the diameter of the inner wall of the groove being slightly less than the inside diameter of the tube part, said base and tube part being interlocked, swaged base material from the outer wall of the groove pressing against the upper flange surface around its entire periphery, the flange being deflected and bent downwardly to a position in which the outer peripheral portions of the bottom surface of the flange are spaced from and not in contact with the base and the leading end of the tube immobilized by being driven into and below the surface of a shoulder extending outwardly from the inner groove wall, to seal the interlock, said interlock being characterized in that an elastic stress is induced and maintained in the flange by the coaction of the swaged material pressing against the flange and the immobilization of the tube end.

4. A structure according to claim 1 wherein the swaged material pressing against the upper periphery of the cap flange is provided by an inwardly collapsed and flowed ring that surrounded the outer periphery of the base groove and projected up from the face of the base.

References Cited

UNITED STATES PATENTS

| 1,851,938 | 3/1932 | Ricke. | |
| 2,464,524 | 3/1949 | Nathan. | |
| 3,198,874 | 8/1965 | Dahl | 174—52 |
| 3,290,077 | 12/1966 | La Barge. | |

FOREIGN PATENTS 798,613 7/1958 Great Britain.

CARL W. TOMLIN, *Primary Examiner.*

ANDREW KUNDRAT, *Assistant Examiner.*